(12) United States Patent
Nomura et al.

(10) Patent No.: US 9,808,890 B2
(45) Date of Patent: Nov. 7, 2017

(54) SOLDER ALLOY

(71) Applicant: Senju Metal Industry Co., Ltd., Tokyo (JP)

(72) Inventors: Hikaru Nomura, Saitama (JP); Shunsaku Yoshikawa, Tokyo (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 0 days.

(21) Appl. No.: 14/394,887

(22) PCT Filed: Apr. 17, 2013

(86) PCT No.: PCT/JP2013/061385
§ 371 (c)(1),
(2) Date: Oct. 16, 2014

(87) PCT Pub. No.: WO2013/157572
PCT Pub. Date: Oct. 24, 2013

(65) Prior Publication Data
US 2015/0086263 A1    Mar. 26, 2015

(30) Foreign Application Priority Data

Apr. 18, 2012   (JP) ................................ 2012-095000

(51) Int. Cl.
| | |
|---|---|
| *B23K 35/26* | (2006.01) |
| *C22C 13/00* | (2006.01) |
| *B23K 35/28* | (2006.01) |
| *B23K 1/00* | (2006.01) |
| *B23K 101/38* | (2006.01) |
| *B23K 1/19* | (2006.01) |
| *B23K 101/32* | (2006.01) |
| *B23K 103/10* | (2006.01) |
| *B23K 101/00* | (2006.01) |

(52) U.S. Cl.
CPC .............. *B23K 35/262* (2013.01); *B23K 1/00* (2013.01); *B23K 1/0016* (2013.01); *B23K 1/19* (2013.01); *B23K 35/282* (2013.01); *C22C 13/00* (2013.01); *B23K 2201/00* (2013.01); *B23K 2201/32* (2013.01); *B23K 2201/38* (2013.01); *B23K 2203/10* (2013.01); *Y10T 403/479* (2015.01)

(58) Field of Classification Search
CPC .......... B23K 1/00; B23K 1/0016; B23K 1/19; B23K 35/262; B23K 35/282; B23K 2201/00; B23K 2201/32; B23K 2201/38; B23K 2203/10; C22C 13/00
See application file for complete search history.

(56) References Cited

U.S. PATENT DOCUMENTS

| | | | |
|---|---|---|---|
| 6,361,626 | B1 | 3/2002 | Kitajima et al. |
| 2003/0007885 | A1 | 1/2003 | Domi et al. |
| 2005/0079092 | A1 | 4/2005 | Ochi et al. |
| 2006/0104854 | A1 | 5/2006 | Kobayashi et al. |
| 2008/0026240 | A1 | 1/2008 | Funaya et al. |
| 2010/0294565 | A1 | 11/2010 | Kawamata et al. |

FOREIGN PATENT DOCUMENTS

| | | |
|---|---|---|
| CN | 1304344 A | 7/2001 |
| CN | 101801588 A | 8/2010 |
| JP | 5-245688 A | 9/1993 |
| JP | 200015478 A | 1/2000 |
| JP | 2000326088 A | 11/2000 |
| JP | 2006167800 A | 6/2006 |
| JP | 2006255784 | 9/2006 |
| JP | 201131253 A | 2/2011 |
| JP | 2011156558 A | 8/2011 |
| JP | 2011235294 A | 11/2011 |
| NL | 1022976 C1 | 9/2004 |
| TW | 503145 B | 9/2002 |
| WO | 0234969 A1 | 5/2002 |
| WO | 2004038053 A2 | 5/2004 |
| WO | 2005102594 A1 | 11/2005 |

*Primary Examiner* — Roy King
*Assistant Examiner* — Caitlin Kiechle
(74) *Attorney, Agent, or Firm* — The Webb Law Firm

(57) ABSTRACT

A solder alloy has an alloy composition containing Zn of 3 through 25 mass %, Ti of 0.002 through 0.25 mass %, Al of 0.002 through 0.25 mass % and balance of Sn, a solder joint made of the solder alloy, and a jointing method using the solder alloy.

8 Claims, 4 Drawing Sheets

SOLDER ALLOY

CROSS-REFERENCE TO RELATED APPLICATIONS

This application is the United States national phase of International Application No. PCT/JP2013/061385 filed Apr. 17, 2013, and claims priority to Japanese Patent Application No. 2012-095000 filed Apr. 18, 2012, the disclosures of which are hereby incorporated in their entirety by reference.

TECHNICAL FIELD

The present invention relates to a solder alloy. It particularly relates to a solder alloy that can suppress any dross occurred when soldering and suppress an erosion phenomenon of Al or Ni plating which is to be jointed and the like.

BACKGROUND

In the past, copper has been used as electrical conducting material for an electric wire used for a wire harness of a vehicle, for a terminal of a motor or circuit wiring used for electrical appliances or the like. The vehicle and the electrical appliances have recently been required for weight saving, the copper (its specific gravity of 8.9) used therefor has been exchanged to aluminum (Al) (its specific gravity of 2.7), the specific gravity of which is approximately one-third of that of Cu.

As a method of soldering such Al electric wire, Al terminal, Al wiring or the like (hereinafter, referred to as "Al member" expedientially), a fusion soldering method such as a dip method or a flow method is exemplified. In the dip method, the soldering is performed while a tip of Al electric wire or Al terminal is dipped into a stationary solder tank. In the flow method, the soldering is performed by contacting jet solder in a jet solder tank to Al wiring. In these soldering methods, the fusion solder in the stationary solder tank or the jet solder tank exposes the air for a long time.

By the way, until now, Sn—Zn solder alloy has been used as the solder alloy for soldering the Al member. This is because Zn has a small electrode potential difference between it and Al so that it can suppress galvanic corrosion. As the Sn—Zn solder alloy, for example, Sn-9Zn, Sn-15Zn and Sn-20Zn, which are stipulated in Japanese Industry Standard (JIS) Z 3281 and exhibit low melting points from the viewpoint of workability, are exemplified.

Furthermore, Patent Document 1 discloses Sn—Zn series solder alloy containing Ti and Al as a solder alloy which directly can solder any hard-to-soldering metal having an oxide film made of Al or the like.

DOCUMENT FOR PRIOR ART

Patent Document

Patent Document 1: Japanese Patent Application Publication No. 2000-326088.

SUMMARY OF THE INVENTION

Problems to be Solved by the Invention

However, while the Sn—Zn solder alloy is able to suppress any corrosion on Al, Zn exhibits high activity and reacts with oxygen in the air so that when using it in the dip method or the flow method, a large amount of dross occurs on a surface of the solder bath. This dross deteriorates an appearance of the solder joint and causes workability to be deteriorated because it should be removed before Al member is dipped. Because of occurrence of the large amount of dross, the solder alloy is intensely exhausted and the cost thereof is increased.

On the other hand, the solder alloy disclosed in the Patent Document 1 contains Ti and Al. These elements are very susceptible to oxidation and they are elements added in order to enhance a jointing strength by improving wettability of an oxide such as glass, ceramics and the like.

However, the soldering of the oxide is performed while removing any foreign matters from a surface of glass plate by means of ultrasonic-wave soldering iron, as described in an embodiment of Patent Document 1. Although the solder alloy disclosed in the Patent Document 1 directly solders Al, it substantially solders an oxide film formed on the Al surface so that it is not used in such an environment that the fusion solder alloy exposes the air for a long time. Therefore, the dross occurred on the surface of solder bath will not turn into problems in Patent Document 1.

Further, an enhancement of the jointing strength with the oxide has studied in Patent Document 1. Since the elements used for the solder alloy are not mutually diffused with elements on a surface of the oxide, intermetallic compound is not formed when jointing them. Therefore, when soldering, erosion phenomenon to the oxide does not occur.

Here, it is also conceivable that even when the dross occurs, the solder alloy could be used for jointing it with Al by removing the dross from the surface of the fusion solder alloy. However, when the surface of the fusion solder alloy discolors or the oxide recurs before jointing it with Al after the dross is eliminated, an appearance of the soldered Al deteriorates.

In addition, there are many cases where Al or the like is plated with Ni in order to suppress any oxidation of the surface thereof, and it is also desirable to suppress an erosion phenomenon of Ni plating which covers the surface to be jointed with Al member.

It is a problem of the present invention to provide a Sn—Zn series solder alloy which can decrease an amount of occurred dross, suppress any discoloration or re-oxidation of the fusion solder alloy even when the fusion solder alloy exposes the air, and suppress an erosion phenomenon of Al and Ni.

Means for Solving the Problems

Inventors have focused on that in order to suppress any oxidation of the solder bath, by adding element(s), which can form an oxide film on the surface of the solder bath in preference to the oxidation of Zn, into a Sn—Zn series solder alloy and suppressing oxygen in the air from entering into the solder bath, the amount of occurred dross can be decreased and have carried out any studies. As the result thereof, the inventors have found out that the oxide film is formed on the surface of the solder bath in a moment by adding into the Sn—Zn solder alloy Al and Ti as the elements that are easy to form an oxide film and that this oxide film suppresses any oxidation of Zn in the solder bath to remarkably decrease the amount of occurred dross. They also have found out beyond expectation that in order to suppress the erosion phenomenon of Al and Ni, by adding Ti together with Al into the Sn—Zn solder alloy at the same time, it is better in the suppression of erosion phenomenon than that of the solder alloy into which only Ti or Al is added. Further, in addition thereof, the inventors have found out that Sn—Zn—Ti—Al solder alloy suppresses discoloration thereof after the dross is removed or recurrence of oxide and they have completed this invention.

Additionally, the inventors have found out that by adding Ni to Sn—Zn—Ti—Al solder alloy, it particularly exhibits an effect of suppressing the erosion phenomenon of Ni at higher level.

Here, the present invention is as follows:

(1) A solder alloy having an alloy composition containing Zn of 3 through 25 mass %, Ti of 0.002 through 0.25 mass %, Al of 0.002 through 0.25 mass % and balance of Sn.

(2) The solder alloy described in the above-mentioned (1) wherein the above-mentioned alloy composition further contains Ni of 0.005 through 0.3 mass %.

(3) The solder alloy described in the above-mentioned (1) or (2) wherein the alloy has the above-mentioned alloy composition and is used for jointing Al.

(4) The solder alloy described in the above-mentioned (1) or (2) wherein the alloy has the above alloy composition and is used for jointing Ni.

(5) The solder alloy described in any one of the above-mentioned (1) through (4) wherein mass ratio of Al and Ti is $0.4 \leq Al/(Al+Ti) < 0.6$.

(6) A solder joint made of the solder alloy described in any one of the above-mentioned (1) through (5).

(7) A jointing method using the solder alloy described in any one of the above-mentioned (1) through (5).

EMBODIMENT FOR CARRYING OUT THE INVENTION

Figure 1:
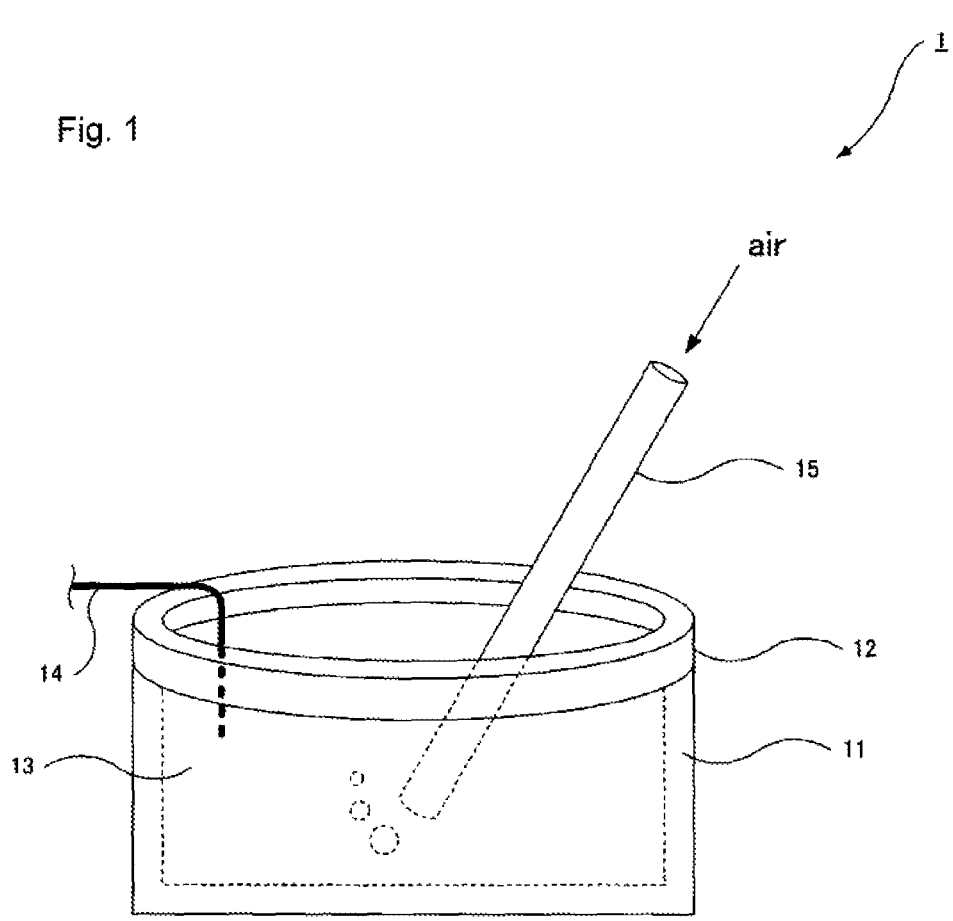
FIG. 1 is a diagram showing a dross occurrence generation apparatus.

The following will describe the invention more in detail. In this specification, the term, % relating to the solder alloy compositions indicates to mass % unless otherwise noted.

Sn—Zn—Ti—Al solder alloy according to the invention can decrease an amount of occurred dross by containing both elements of Ti and Al therein. Zn in the solder alloy exhibits high activity. When adding Ti and Al, oxide films of Ti and Al are formed on the surface of solder alloy prior to the reaction of Zn with oxygen in the air. This oxide films result in suppressing the reaction of Zn in the solder alloy with oxygen in the air. Accordingly, the solder alloy according to the invention can decrease the amount of occurred dross even if the fusion solder alloy is exposed to the air.

Further, the Sn—Zn—Ti—Al solder alloy according to the invention can suppress an erosion phenomenon of Al. In general, the erosion phenomenon is a phenomenon in which elements of the solder alloy and elements of the object to be jointed are mutually diffused and the elements of the object to be jointed are eluted into the solder alloy to erode the object to be jointed. In order to suppress the erosion phenomenon of Al, it is possible to suppress diffusion of Al into the solder alloy by adding Ti, which has higher diffusion coefficient to Sn than that of Al, not only by increasing the amount of Al content, from the point of view of preventing Al from being diffused in Sn, and to decrease the erosion phenomenon of Al. The higher the fusion temperature of the solder bath is, this phenomenon remarkably appears. The Sn—Zn—Ti—Al solder alloy according to the invention also can suppress an erosion phenomenon of Ni. It is possible to suppress diffusion of Ni into the solder alloy by adding Ti, which has higher diffusion coefficient to Sn than that of Ni, not only by increasing the amount of Ni content, from the point of view of preventing Ni from being diffused in Sn, and to decrease the erosion phenomenon of Ni.

Alloy composition of the solder alloy according to the invention is as follows:

The amounts of Zn content are 3 through 25%. Zn improves soldability to Al. When Zn is less than 3%, it is impossible to suppress galvanic corrosion. When Zn is more than 25%, the melting point of the solder alloy becomes too high so that it is hard to deal therewith, which causes workability to be deteriorated. The amounts of Zn content are preferably 4 through 23%, are more preferably 5 through 20% and are particularly preferably 12 through 20%.

The amounts of Ti content are 0.002 through 0.25%. Ti can suppress the amount of occurred dross and the erosion phenomenon of Al. When the amounts of Ti are less than 0.002%, it is impossible to obtain an effect of suppressing the erosion phenomenon of Al and when Ti is not contained, it may be impossible to suppress an amount of occurred dross. When Ti is more than 0.25%, the melting point of the solder alloy becomes high, which causes the oxide to recur even if the dross is removed. The amounts of Ti content are preferably 0.002 through 0.23%, and are more preferably 0.005 through 0.20%.

The amounts of Al content are 0.002 through 0.25%. Al decreases the amount of occurred dross and suppresses the erosion phenomenon of Al, which is similar to Ti. When the amounts of Al content are less than 0.002%, it is impossible to obtain an effect of suppressing the amount of occurred dross and the erosion phenomenon of Al. The surface of the solder alloy fused in the solder bath is discolored and the appearance of the solder joint formed by using the discolored solder alloy deteriorates. Further, it causes the oxide to recur even if the dross is removed. When Al is more than 0.25%, the melting point of the solder alloy becomes high, which causes the oxide to recur even if the dross is removed. The amounts of Al content are preferably 0.002 through 0.23%, and are more preferably 0.005 through 0.20%.

Total amounts of Ti content and Al content are preferably 0.002 through 0.4%. When they are within this range, they can suppress a rise of the melting point thereof, decrease the amount of occurred dross, suppress the erosion phenomenon of Al and Ni, prevent the appearance from being discolored and suppress recurrence of oxide after the dross is removed. The total amounts of Ti content and Al content are preferably 0.004 through 0.4%, particularly preferably 0.01 through 0.4%.

Further, it is preferable that mass ratio of Al and Ti is $0.41 \leq Al/(Al+Ti) < 0.6$. When this condition is satisfied, it is particularly possible to suppress the erosion phenomenon of Al. The thicker Al wire is, its surface area is decreased, so that the effect of suppressing the erosion phenomenon remarkably appears. In other words, when Al wire is thick, it is possible to prevent Al from eroding because a much period of time taken for Al wire to be disconnected is required. The above ratio is preferably 0.5≤Al/(Al+Ti)<0.6. It is the upper limit thereof is less than 0.6 because the effect of suppressing the erosion phenomenon of Ti is obtained.

The solder alloy according to this invention can contain further Ni. Ni can suppress the erosion phenomenon of Al and also can suppress the erosion phenomenon of Ni when Ni is plated on a surface of Al. It is possible to further suppress the erosion phenomenon of Ni by adding Ni in presence of Ti and Al.

There is a limitation of solid solution amount of Ni into the fusion solder alloy. When the solder alloy contains Ni previously, the solid solution amount of Ni at soldering is decreased. Since Ti has higher diffusion coefficient to Sn than that of Ni, the solid solution amount of Ni is also decreased by adding Ti. Accordingly, by adding Ni, it is possible to suppress the erosion phenomenon of Ni. From such a viewpoint, the amounts of Ni content are preferably 0.005 through 0.3%. From a viewpoint of suppressing rise in the melting point of the solder alloy, they are more preferably 0.01 through 0.25%.

The solder alloy according to this invention can contain any inevitable impurities other than the above-mentioned elements. Even if it contains inevitable impurities, it goes without saying that that has no influence upon the above-mentioned effects.

The solder alloy according to this invention is used for the fusion soldering method. As the fusion soldering method, a method in which a stationary solder tank that does not move any surface of the solder bath is used (a dip method) or a method in which a jet solder tank that causes waves through the solder surface is used (a flow method is exemplified.

Although the solder alloy according to this invention is principally used for jointing Al and Ni, it can be used for jointing any elements such as Cu member, Cu electrode and the like other than Al and Ni.

The solder alloy according to this invention can be used in the form of bar solder, solder ball, preform, a wire or the like. Particularly, the solder ball according to this invention is typically spherical solder having a diameter of about 0.01 through 1.0 mm. The solder ball can be manufactured by a general method of manufacturing the solder ball.

As a jointing method using the solder alloy according to this invention, for example, a general method such that the solder alloy is molten in the solder bath and then, a flux is applied to the terminal and is dipped into the solder bath is exemplified. Using the solder alloy according to this invention does not impose any special conditions to the jointing method according to this invention. When doing such jointing, temperature of the solder alloy molten in the solder bath is preferably about 400 degrees C. As described above, the solder alloy according to this invention is particularly applicable to a use for the fusion soldering method.

The solder alloy according to this invention can use for connecting the solder alloy according to this invention with a terminal of electronic component such as a transformer, a capacitor, a coil and the like and a terminal of driving part such as a motor and the like. In the other words, the solder joint according to this invention is referred to as the jointed portion between such a terminal and the solder. Thus, the solder joint according to this invention can be formed using the above-mentioned general soldering conditions.

It is to be noted that the solder alloy according to this invention becomes low a ray solder alloy by manufacturing it using high purity material or low a ray material. When this solder alloy is used for jointing the terminals around a memory or the like, it is possible to prevent any soft errors from occurring.

Executed Examples

Measurements of the period of time (seconds) required for disconnection of Al wire and the dross weight (g), an evaluation of discoloration in the fusion solder alloy, an evaluation of re-oxidation suppression and measurement of the period of time (seconds) required for disconnection of Ni wire were carried out using the solder alloys composed of alloy compositions shown in the Table 1. The following will describe each of the evaluation methods thereof.

(1) Measurement of Dross Weight:

FIG. 1 is a diagram showing a dross occurrence apparatus 1. Solder alloy of 1000 g was inserted into a solder tank 12 having a volume of 150 cc, which was capable of being heated by a heater 11. The solder alloy was heated and molten to be a solder bath 13 so that the temperature of the solder alloy introduced into the solder tank 12 was 400 degrees C. measured by a temperature sensor 14. The air was then blown into the solder bath 13 for 10 minutes through a gas pipe 15 at a condition of 150 cc/min. After finishing the blow, dross formed on the surface of the solder bath 13 was gathered and its dross weight was measured. In the embodiments, it is evaluated that the embodiments having dross weight of less than 30 g have no practical problem. In addition, the alloy compositions of the solder baths 13 were as shown in Table 1 and the above studies were carried out on each alloy composition. The results thereof were also shown in Table 1.

(2) Measurement of Period of Time required for Disconnection of Al Wire

Figure 2:
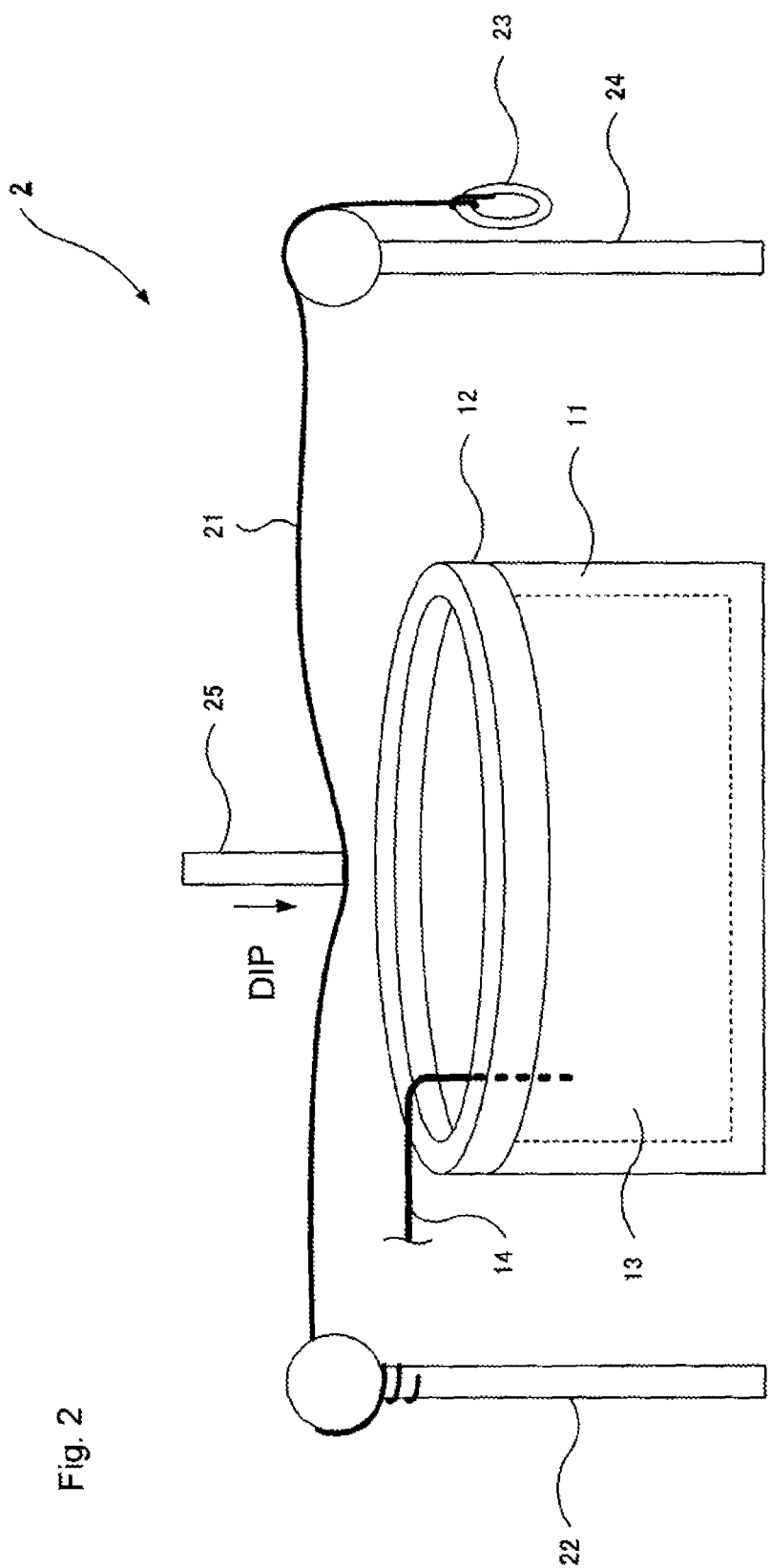
FIG. 2 is a diagram showing Al and Ni erosion test device.

FIG. 2 is a diagram showing Al and Ni erosion test device 2 which was used for measuring periods of time required for disconnection of Al and Ni wires. After a flux (Alphalux No. 2A; manufactured by Senju Metal Industry Co., Ltd.) was applied to Al wire 21 having a diameter of 0.4 mm, an end of the Al wire 21 was fixed to a fixing column 22 and the other end thereof was connected with a weight 23 and supported by a stay 24. After the solder alloy was inserted into the solder tank 12, it was molten at 400 degree C. to be the solder bath 13, which is similar to FIG. 1, and the Al wire 21 was pushed downwards by a dipping jig 25 and was dipped up to depth of 5 mm from the surface of the solder bath 13. Periods of time required from the dipping to disconnection of Al wire 21 (dropping of the weight 23) were measured. These five same tests were repeated and the mean value of the periods of time required for disconnection of Al wire 21 was obtained. In the embodiments, it is evaluated that the embodiments having the periods of time required for disconnection of Al wire of 50 seconds or more have no practical problem. In addition, the alloy compositions of the solder baths 13 were as shown in Table 1 and the above studies were carried out on each alloy composition. The results thereof were also shown in Table 1.

(3) Evaluation of Discoloration

The solder alloy was molten at 400 degrees C. in the solder tank 12 shown in FIG. 1 and a degree of the discoloration of the surface of the solder bath 13 was observed through visual contact. In the embodiments, it is evaluated that the embodiments having no discoloration have no practical problem. The results thereof were also shown in Table 1.

(4) Evaluation of Re-Oxidation Suppression

After the dross was gathered in (1), the solder bath 13 was leaved as it was at 400 degrees C. for 10 minutes in the air and a degree of the oxide which was able to recur on the surface of the solder bath 13 was observed through visual contact. The evaluation was performed on the basis of the following judges. In the embodiments, it is evaluated that the embodiments indicated by a double circle mark have no practical problem. The results thereof were shown in Table 1.

Double Circle Mark (Better): The recurrence of oxide is not almost observed.

Single Circle Mark (Good): The recurrence of oxide is slightly observed.

Cross Mark (Poor): The recurrence of oxide is clearly observed.

Figure 3:
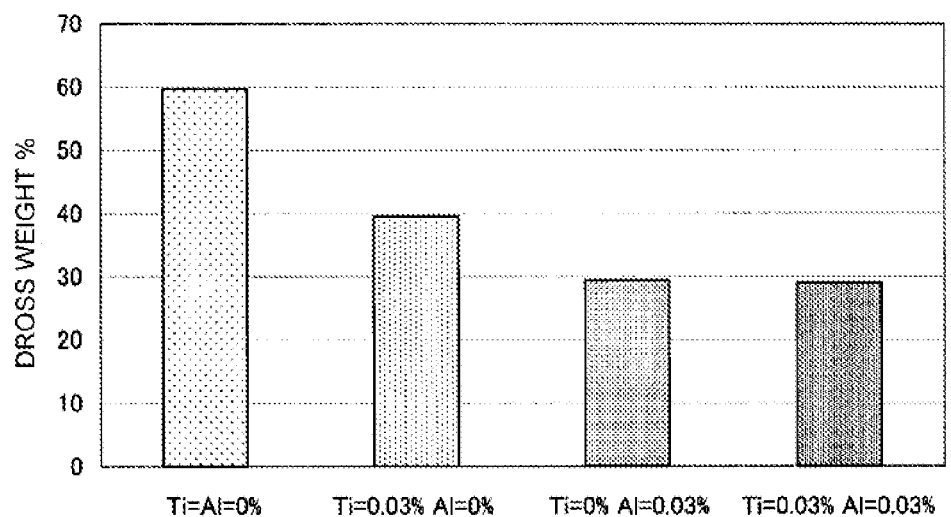
FIG. 3 is a graph showing a dross weight of Sn-15Zn—(Ti)—(Al) solder alloy.

FIG. 3 is a graph showing a dross weight of Sn-15Zn—(Ti)—(Al) solder alloy. From FIG. 3, it was clear that the dross weight was considerably suppressed when adding Al (and Ti) to Sn—Zn solder alloy.

Figure 4:
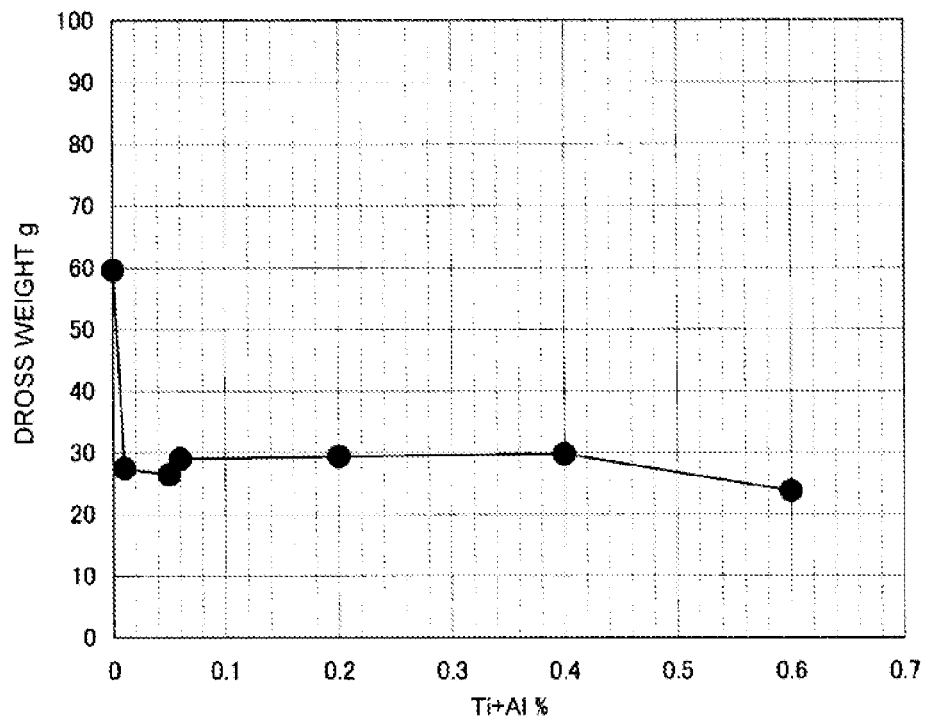
FIG. 4 is a graph showing a relationship between the dross weight and a total amount of Ti and Al.

FIG. 4 is a graph showing a relationship between the dross weight and a total amount of Ti and Al. From FIG. 4, it was clear that the dross weight suddenly decreased when the amounts of Ti and Al contents were 0.01% or more and subsequently stayed at same level. Further, the embodiments 8 through 10 containing Ni also showed the dross weights

TABLE 1

| | ALLOY COMPOSITIONS (%) | | | | | PERIOD OF TIME(S) Required for Disconnection | DROSS WEIGHT | | EVALUATION OF RE-OXIDATION |
|---|---|---|---|---|---|---|---|---|---|
| | Sn | Zn | Ti | Al | Ni | Al/(Al + Ti) | of Al wire | (g) | Discoloration | SUPPRESSION |
| EMBODIMENT 1 | bal. | 5 | 0.03 | 0.03 | | 0.5 | 99.45 | 27.53 | Nothing | ◎ |
| EMBODIMENT 2 | bal. | 15 | 0.006 | 0.005 | | 0.5 | 60.64 | 27.44 | Nothing | ◎ |
| EMBODIMENT 3 | bal. | 15 | 0.03 | 0.02 | | 0.4 | 62.76 | 26.45 | Nothing | ◎ |
| EMBODIMENT 4 | bal. | 15 | 0.03 | 0.03 | | 0.5 | 62.66 | 28.98 | Nothing | ◎ |
| EMBODIMENT 5 | bal. | 15 | 0.1 | 0.1 | | 0.5 | 68.73 | 29.35 | Nothing | ◎ |
| EMBODIMENT 6 | bal. | 15 | 0.2 | 0.2 | | 0.5 | 71.85 | 29.79 | Nothing | ◎ |
| EMBODIMENT 7 | bal. | 20 | 0.03 | 0.03 | | 0.5 | 61.85 | 24.48 | Nothing | ◎ |
| EMBODIMENT 8 | bal. | 15 | 0.03 | 0.03 | 0.03 | 0.5 | 59.33 | 25.08 | Nothing | ◎ |
| EMBODIMENT 9 | bal. | 15 | 0.03 | 0.03 | 0.1 | 0.5 | 64.27 | 25.02 | Nothing | ◎ |
| EMBODIMENT 10 | bal. | 15 | 0.03 | 0.03 | 0.2 | 0.5 | 67.3 | 26.37 | Nothing | ◎ |
| COMPARISON EXAMPLE 1 | bal. | 5 | | | | — | 49.83 | 56.05 | Existence | X |
| COMPARISON EXAMPLE 2 | bal. | 15 | | | | — | 32.58 | 59.62 | Existence | X |
| COMPARISON EXAMPLE 3 | bal. | 20 | | | | — | 31.42 | 83.06 | Existence | X |
| COMPARISON EXAMPLE 4 | bal. | 15 | 0.03 | | | 0 | 40.50 | 39.59 | Existence | ○ |
| COMPARISON EXAMPLE 5 | bal. | 15 | | 0.03 | | 1 | 38.78 | 29.43 | Nothing | ◎ |
| COMPARISON EXAMPLE 6 | bal. | 15 | | | 0.03 | — | 45.21 | 62.05 | Existence | X |
| COMPARISON EXAMPLE 7 | bal. | 15 | 0.0005 | 0.0005 | | 0.5 | 33.21 | 57.66 | Existence | X |
| COMPARISON EXAMPLE 8 | bal. | 15 | 0.3 | 0.3 | | 0.5 | 84.47 | 23.78 | Nothing | ○ |

As shown in Table 1, in the embodiments 1 through 10, all of the alloy compositions indicated the results having no practical problem.

The comparison examples 1 through 3 not containing Ti and Al indicated large dross weights, discoloration on the surface of the solder bath and cross mark of the valuation of re-oxidation suppression. The comparison example 4 not containing Al indicated the discoloration and the single circle mark of the valuation of re-oxidation suppression that was the result having any practical problem. The comparison example 5 not containing Ti indicated the result of a short period of time required for disconnection of Al wire. The comparison example 6 containing Ni but not containing Ti and Al indicated large dross weights, discoloration and cross mark of the valuation of re-oxidation suppression. The comparison example 7 containing small amounts of Ti and Al contents indicated the results having any practical problem concerning all of the period of time required for disconnection of Al wire, the dross weight, the discoloration and the evaluation of re-oxidation suppression. The comparison example 8 containing large amounts of Ti and Al contents indicated the high melting point and the single circle mark of the valuation of re-oxidation suppression that was the result having any practical problem.

The following will further describe the advantages of this invention on the basis of FIGS. 3 through 6 which gather and show the results shown in Table 1.

having the same level as the dross weights of the embodiments 1 through 7 not containing Ni.

Figure 5:
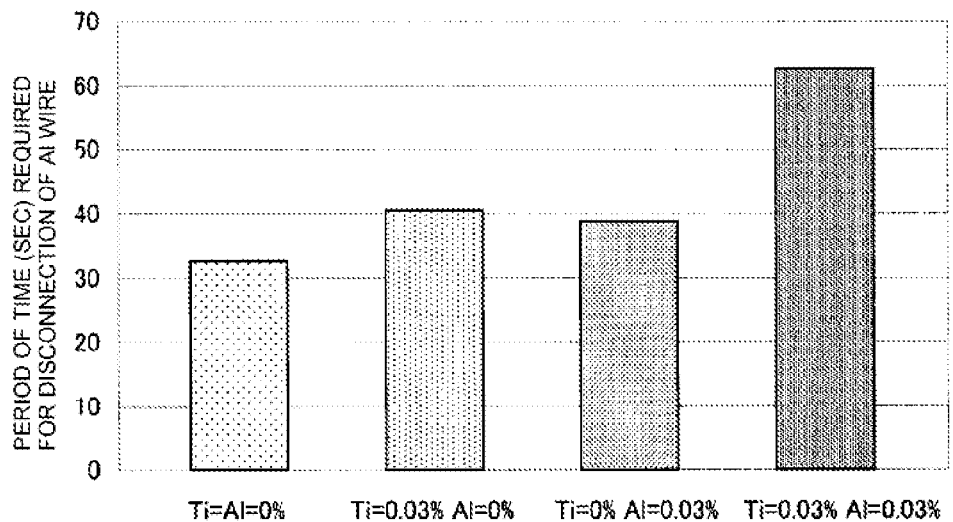
FIG. 5 is a graph showing a period of time required for disconnection of Al wire in Sn-15Zn—(Ti)—(Al) solder alloy.

FIG. 5 is a graph showing a period of time required for disconnection of Al wire in Sn-15Zn—(Ti)—(Al) solder alloy. From FIG. 5, it was clear that the period of time required for disconnection of Al wire was extended when adding Ti or Al to Sn—Zn solder alloy and the period of time required for disconnection of Al wire was further extended when adding Ti and Al thereto.

Figure 6:
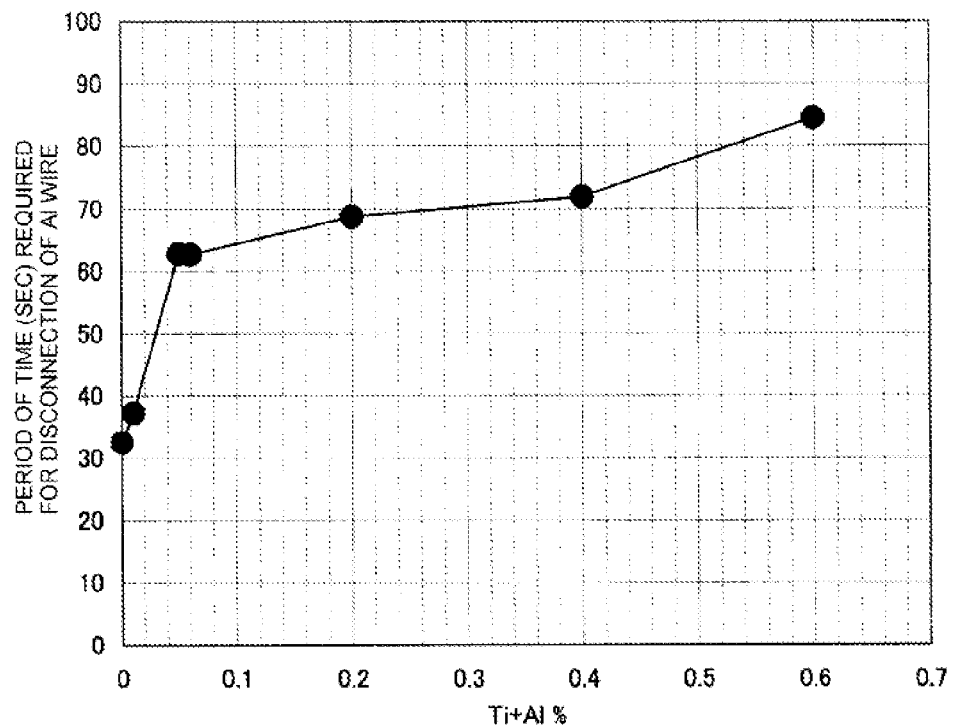
FIG. 6 is a graph showing a relationship between the period of time required for disconnection of Al wire and the total amount of Ti and Al.

FIG. 6 is a graph showing a relationship between the period of time required for disconnection of Al wire and the total amount of Ti and Al. From FIG. 6, due to an increase of the amounts of Ti and Al contents, the period of time required for disconnection of Al wire was extended. This may be because the increase of the amounts of Ti and Al contents allows the erosion phenomenon of Al to be suppressed. In addition, the embodiments 8 through 10 containing Ni also showed the periods of time required for disconnection of Al wire, which had the same level as the periods of time required for disconnection of Al wire of the embodiments 1 through 7 not containing Ni.

However, from FIGS. 4 and 6, focusing on the dross weight and the period of time required for disconnection of Al wire, it is conceivable that the comparison example 8 of Ti (0.3%)+Al(0.3%)=0.6 is the best. As shown in Table 1, however, the oxide slightly recurred in this alloy composition so that this did not satisfy all of the evaluation items that should be studied in these embodiments.

(5) Measurement of Period of Time required for Disconnection of Ni Wire

In the embodiments, in order to evaluate the effect of suppressing the erosion phenomenon of Ni, the mean value of the periods of time required for disconnection of Ni wire was obtained, which is similar to (2) measurement of the periods of time required for disconnection of Al wire, except for the use of Ni wire having a diameter of 0.1 mm. It is evaluated that the embodiments having the periods of time required for disconnection of Ni wire of 240 seconds or more have no practical problem. The results thereof were shown in Table 2.

TABLE 2

| | ALLOY COMPOSITIONS (%) | | | | | PERIOD OF TIME(S) Required for Disconnection of Ni wire |
|---|---|---|---|---|---|---|
| | Sn | Zn | Ti | Al | Ni | |
| EMBODIMENT 4 | bal. | 5 | 0.03 | 0.03 | | 248.72 |
| EMBODIMENT 8 | bal. | 15 | 0.03 | 0.03 | 0.03 | 265.47 |
| COMPARISON EXAMPLE 2 | bal. | 15 | | | | 212.56 |

Both of the embodiment 4 not containing Ni and the embodiment 8 containing Ni exhibited the results of the periods of time required for disconnection of Ni wire exceeding 240 seconds. Particularly, it was clear that in the embodiment 8 containing Ni, the periods of time required for disconnection of Ni wire was extended and the erosion phenomenon of Ni was much more suppressed. In the comparison example 2 not containing Ti, Al and Ni, the Ni wire was immediately disconnected. It has been understood that the solder alloy according to this invention can suppress the erosion phenomenon of Ni, too.

From the above, the solder alloy according to this invention is preferably applied for soldering Al, which is used for a terminal of an axial type electronic component such as a motor and circuit wiring, using the fusion solder. To solder it using the fusion solder, the solder bath in the solder tank exposes the air. In even such a use environment, the solder alloy according to this invention can suppress the amount of occurred dross, suppress the erosion phenomenon of Al and Ni, stop discoloration when being molten, and prevent re-oxidation after the dross is removed. Namely, it is particularly effective when using the fusion solder alloy in the environment in which it exposes the air, for example, when dipping Al terminal of electronic component into the solder bath and when soldering Al circuit wiring by the flow method.

DESCRIPTION OF CODES

1 . . . Dross Occurrence Apparatus
2 . . . Al Erosion Test Device

The invention claimed is:

1. A solder joint made of a solder alloy having an alloy composition comprising Zn of 3 through 25 mass %, Ti of 0.002 through 0.25 mass %, Al of 0.002 through 0.25 mass %, Ni of 0.005 through 0.3 mass % and balance of Sn,
wherein the solder joint forms a metal junction between the alloy and an Al surface or an Ni surface.

2. The solder joint claimed in claim 1, wherein mass ratio of Al and Ti in the solder alloy is 0.4≤Al/(Al+Ti)<0.6.

3. The solder joint claimed in claim 1, wherein the solder joint forms the metal junction between the alloy and the Al surface.

4. The solder joint made of the solder alloy claimed in claim 1, wherein the solder joint forms the metal junction between the alloy and the Ni surface.

5. A jointing method comprising forming the solder joint of claim 1.

6. A jointing method comprising forming the solder joint of claim 2.

7. A jointing method comprising forming the solder joint of claim 3.

8. A jointing method comprising forming the solder joint of claim 4.

* * * * *

UNITED STATES PATENT AND TRADEMARK OFFICE
CERTIFICATE OF CORRECTION

PATENT NO. : 9,808,890 B2  
APPLICATION NO. : 14/394887  
DATED : November 7, 2017  
INVENTOR(S) : Hikaru Nomura et al.

Page 1 of 1

It is certified that error appears in the above-identified patent and that said Letters Patent is hereby corrected as shown below:

In the Claims

Column 10, Line 31, Claim 4, after "joint" delete "made of the solder alloy"

Signed and Sealed this
Twenty-seventh Day of March, 2018

Andrei Iancu
*Director of the United States Patent and Trademark Office*